United States Patent
Fifield et al.

(10) Patent No.: US 8,792,600 B2
(45) Date of Patent: Jul. 29, 2014

(54) FRACTIONAL FREQUENCY AND SAMPLING-RATE CHANGE IN THE FREQUENCY DOMAIN

(75) Inventors: Robert Fifield, Gurnard (GB); Brian John Minnis, Crawley (GB)

(73) Assignee: NXP B.V., Eindhoven (NL)

( * ) Notice: Subject to any disclaimer, the term of this patent is extended or adjusted under 35 U.S.C. 154(b) by 485 days.

(21) Appl. No.: 13/141,861

(22) PCT Filed: Dec. 17, 2009

(86) PCT No.: PCT/IB2009/055809
§ 371 (c)(1),
(2), (4) Date: Jul. 6, 2011

(87) PCT Pub. No.: WO2010/076727
PCT Pub. Date: Jul. 8, 2010

(65) Prior Publication Data
US 2011/0261913 A1 Oct. 27, 2011

(30) Foreign Application Priority Data
Dec. 29, 2008 (EP) .................... 08172991

(51) Int. Cl.
*H04B 1/10* (2006.01)
(52) U.S. Cl.
USPC .............. 375/350; 375/346; 375/316
(58) Field of Classification Search
USPC ........................... 375/350, 346, 316
See application file for complete search history.

(56) References Cited

U.S. PATENT DOCUMENTS

| 4,241,443 A | 12/1980 | Sakaki et al. |
| 6,177,835 B1 | 1/2001 | Grebowsky et al. |
| 6,247,035 B1 | 6/2001 | Hellberg |
| 2002/0106009 A1 | 8/2002 | Harrison |
| 2002/0126778 A1* | 9/2002 | Ojard et al. ............ 375/346 |
| 2003/0058975 A1* | 3/2003 | Baas et al. ............ 375/350 |
| 2004/0052523 A1* | 3/2004 | Yadlowsky et al. ......... 398/34 |
| 2006/0256884 A1 | 11/2006 | Tomioka et al. |

OTHER PUBLICATIONS

Hentschel, T., et al. "The Digital Front-End of Software Radio Terminals", IEEE Personal Communications, 7 pages (Aug. 1999).

M. Kiessling, et al. "A Software Radio Architecture for Multi-Channel Digital Upconversion and Downconversion Using Generalized Polyphase Filterbanks with Frequency Offset Correction", 13th IEEE Intl. Symp. on Personal, Indoor and Mobile Radio Communications, 5 pages (2002).

(Continued)

*Primary Examiner* — Michael Neff

(57) ABSTRACT

An arrangement (30) and a method for digitally filtering a time-discrete digital signal, wherein the signal is transformed to the frequency domain using discrete Fourier transformation (31), the signal is filtered in the frequency domain (33), wherein a filter response can be adapted in real time as required to respond to changes in the interference environment, and the filtered signal is transformed back to the time domain using inverse discrete Fourier transformation (32) to create an output signal, and wherein bin frequencies of said signal in the frequency domain are translated by a real amount and the sampling rate of the output signal is changed by a real factor.

14 Claims, 4 Drawing Sheets

(56) References Cited

OTHER PUBLICATIONS

Vootukuru, M., et al. "FPGA Based Power Efficient Channelizer for Software Defined Radio", Proc. of the SDR 05 Technical Conf. and Product Exposition, 6 pages (2005).

Jondral, F. "Software-Defined Radio—Basics and Evolution to Cognitive Radio", EURASIP J. on Wireless Communications and Networking 2005:3, pp. 275-283 (2005).

Hueber, G., et al. "On the Design of a Multi-Mode Receive Digital-Front-End for Cellular Terminal RFICs", Wireless Technology 2005, 4 pgs. (2005).

Abu-Al-Saud, W., et al. "Efficient Sample Rate Conversion for Software Radio Systems", IEEE Trans. on Signal Processing, vol. 54, No. 3, 8 pages (Mar. 2006).

International Search Report and Written Opinion for Int'l Application PCT/IB2009/055809 (Jun. 21, 2010).

* cited by examiner

FRACTIONAL FREQUENCY AND SAMPLING-RATE CHANGE IN THE FREQUENCY DOMAIN

FIELD OF THE INVENTION

The present invention relates to radio receiver systems, and more particularly to frequency and sample-rate adaptation in digital filtering of signals in the frequency domain.

BACKGROUND OF THE INVENTION

As mobile phones become more complicated and able to support many different radio standards such as Global System for Mobile Communications (GSM), Enhanced Data Rates for GSM Evolution (EDGE), Universal Mobile Telecommunications System (UMTS), Code Division Multiple Access 2000 (CDMA2000) and Time Division Synchronous Code Division Multiple Access (TD-SCMA) etc, the need for highly-adaptive channel filtering in the digital domain becomes ever stronger. The radio receivers of mobile phones already contain significant amounts of digital signal processing. Most of the digital filters used are based on finite impulse response (FIR) or infinite impulse response (IIR) blocks which process the wanted signal in the time domain. This is adequate in terms of power efficiency and area occupancy, but it tends to have serious short-comings in terms of ease of design and adaptability.

Carrying out the digital filtering in the frequency domain can offer equivalent performance but with significantly improved ease of design, adaptability and control. Digital filters offering selectivity on demand in response to changes in the signal-interference environment around the mobile phone would enable significant savings in battery consumption.

Highly-adaptive digital filtering in the frequency domain has already been proposed as an important innovation in the context of Software-defined Radio (SDR), described e.g. in "*The Digital Front-End of Software Radio Terminals*" by Tim Hentschel at al., IEEE Personal Communications, p. 6-12, August 1999. It offers greater inherent flexibility and intuitive control than conventional time-domain digital filtering regimes. Future multi-mode mobile phones will be a key beneficiary of such technique.

The requirement for a frequency translation arises mostly in a receiver configured for low-IF operation in support of narrow-band radio standards such as GSM and EDGE. Moving the IF (intermediate frequency) away from zero frequency tends to reduce the impact of 1/f noise and helps with the elimination of DC offsets. When the frequency translation takes place in the digital domain, the wanted signal can be moved back to zero prior to demodulation in the baseband modem. It is to be noted that it is important to be able to translate the frequency by an arbitrary (if still small) amount. It should also be noted that if implemented in the time domain, the frequency translation involves a repeated complex multiplication of the signal at the sampling rate, which can consume significant computational resources and battery power.

The multi-mode requirement of a mobile phone implies multiple bit rates, which again implies the requirement of multiple sampling rates for the wanted signal as it passes throughout the digital parts of the radio. However, it would be preferable to use a single sampling and clock frequency for all modes, irrespective of the required bit rates. This necessitates the use of fractional rate-matching (i.e. mostly decimation) at the output of the radio, so that data is delivered to the baseband modem with the correct time stamps.

Furthermore, in previous radio systems based on the use of a fixed array of decimation filters and a programmable channel filter in the time domain, de-rotation and sampling-rate changes were achieved using an interpolation scheme of one sort or another. These two operations can account for up to 30% of the power consumption of the digital receiver hardware. Accordingly, it would be advantageous to carry out these operations in the frequency domain for little or no extra power consumption.

SUMMARY OF THE INVENTION

Thus, it is one object of the present invention to provide a method and an implementation, which enables adjustment of certain critical signal parameters as part of the frequency-domain signal processing.

Accordingly, the method comprises: transforming said signal to the frequency domain using discrete Fourier transformation (DFT) having a predetermined resolution; filtering said signal in the frequency domain; transforming said filtered signal back to the time domain using inverse discrete Fourier transformation (IDFT) to create an output signal; wherein bin frequencies (frequency components) of said signal in the frequency domain are translated by a real amount; and wherein a sampling rate of said output signal is changed by a real factor.

With this method an exact frequency translation of signals can be achieved by re-assigning the bin frequencies of the signal in the frequency domain. This can be done in several places: firstly, after the DFT but before the filtering; secondly, after the filtering but before the IDFT; or thirdly, a combination of the two. With this approach the wanted signal frequency can be shifted to any new frequency between zero Hz and ±half the sampling frequency, subject to the limits imposed by Nyquist. Thus, very little signal processing is involved.

Furthermore, with this method a sample rate change by an irrational factor can be implemented by adjusting the minimum phase step of the IDFT operation. The time-domain components of the signal remain orthogonal as long as they are all generated using multiples of this minimum phase step. Additionally knowledge of the final phase value of each Fourier component can be retained in order to ensure signal continuity with the next block of signal. Hence, the sampling-rate change consumes no additional signal processing power over and above that needed to perform the basic IDFT. This process also assumes that the Nyquist sample rate theorem is not violated.

At least one object is further achieved by an arrangement for digitally filtering a time-discrete signal according to claim 10.

Accordingly, the arrangement comprises: a first transformer which transforms said signal to the frequency domain using discrete Fourier transformation having a predetermined resolution; at least one translator which translates bin frequencies of said signal in the frequency domain by a real amount; a frequency domain filter which filters said signal in the frequency domain; a second transformer which transforms said signal back to the time domain using inverse discrete Fourier transformation to create an output signal; wherein said second transformer comprises means for changing a sampling rate of the output signal by a real factor.

It is noted that the arrangement can advantageously be used in a radio receiver system. Furthermore, the method according to the invention can be implemented by hardware, software, or a combination of both.

Summarizing, the basic idea of the invention resides in efficiently adapting a frequency and a sampling rate of a signal and carrying out these operations in the frequency domain for little or no extra power consumption. As well as providing frequency translation and sampling-rate conversion, the arrangement offers much greater ease of filter adaptation in response to changes in the levels of interference which may accompany the wanted signal. In the frequency domain, it is both easier to detect changes in interferer levels and take action against them using the channel filter.

Preferred embodiments and further developments of the invention are defined in the dependent claims of the independent claims. It shall be understood that the arrangement and the method of the invention have similar and/or identical preferred embodiments and advantages.

BRIEF DESCRIPTION OF THE DRAWINGS

These and other aspects of the invention will be apparent from and elucidated with reference to the embodiment(s) described hereinafter. In the following drawings, the figures are schematically drawn and not true to scale, and identical reference numerals in different figures, if any, may refer to corresponding elements. It will be clear for those skilled in the art that alternative but equivalent embodiments of the invention are possible without deviating from the true inventive concept, and that the scope of the invention is limited by the claims only.

DETAILED DESCRIPTION OF EMBODIMENTS

Figure 1:
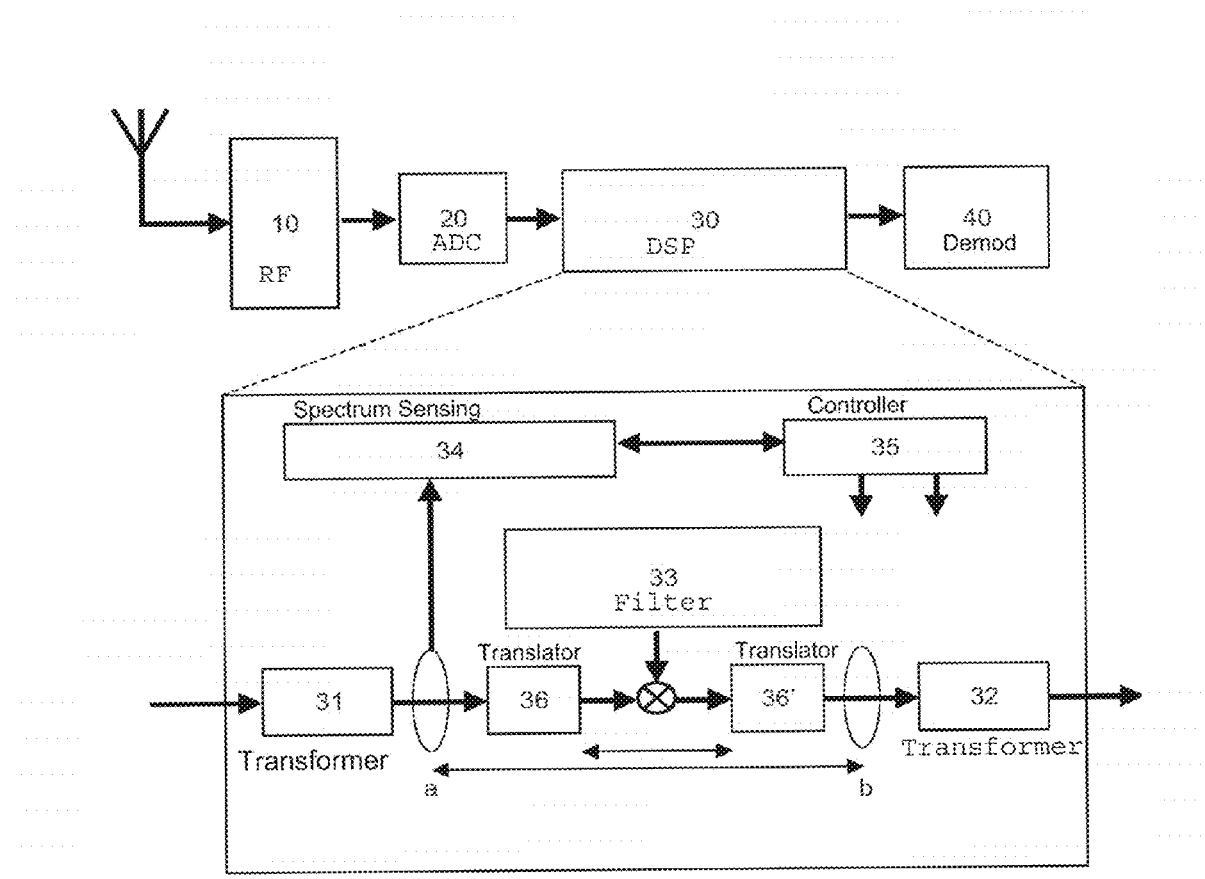
FIG. 1 is a schematic diagram showing an arrangement according to an embodiment of the present invention as a part of a radio receiver system.

FIG. 1 is a schematic diagram showing a simplified example of a radio receiver system, wherein an arrangement 30 for the frequency-domain digital signal processing is shown in expanded detail. The input signal from the RF front-end 10 is input into an analog to digital converter (ADC) 20. The ADC 20 in this case is an over-sampled type such as a sigma delta modulator and therefore the signal may require decimation before demodulation. The signal coming from the ADC 20 is translated into the frequency domain by the first transformer 31 using discrete Fourier transformation (DFT), after which a filtering function 33 is applied before the signal is translated back to the time domain by the second transformer 32 using inverse discrete Fourier transformation (IDFT) and applying a sample rate change (SRC). An important feature of the frequency-domain processing is the sensing of the frequency content of the radio signal before and/or after filtering at the sensing points a and/or b (ellipses in FIG. 1). It is this sensing which facilitates the adaptation of the filter characteristics in response to changes in the external interference environment.

It is noted that the DFT resolution can be factory set, pre-calculated by the controller or calculated on the fly as the signal characteristics changes. Although not shown here, there may be several DFT operations working in close cooperation to minimize processing load. Also, the use of a Fast Fourier Transform (FFT) is not precluded.

Frequency translation can be provided by at least one translator 36, 36' on either side of the filter block 33, and as this is primarily a re-labelling exercise of the bin frequencies, the extra processing overhead is very small.

Fractional re-sampling (SRC) takes place after the filter block 33 as part of the IDFT operation in the second transformer 32. More details of the frequency-shifting and rate-matching operations are given below.

Figure 2:
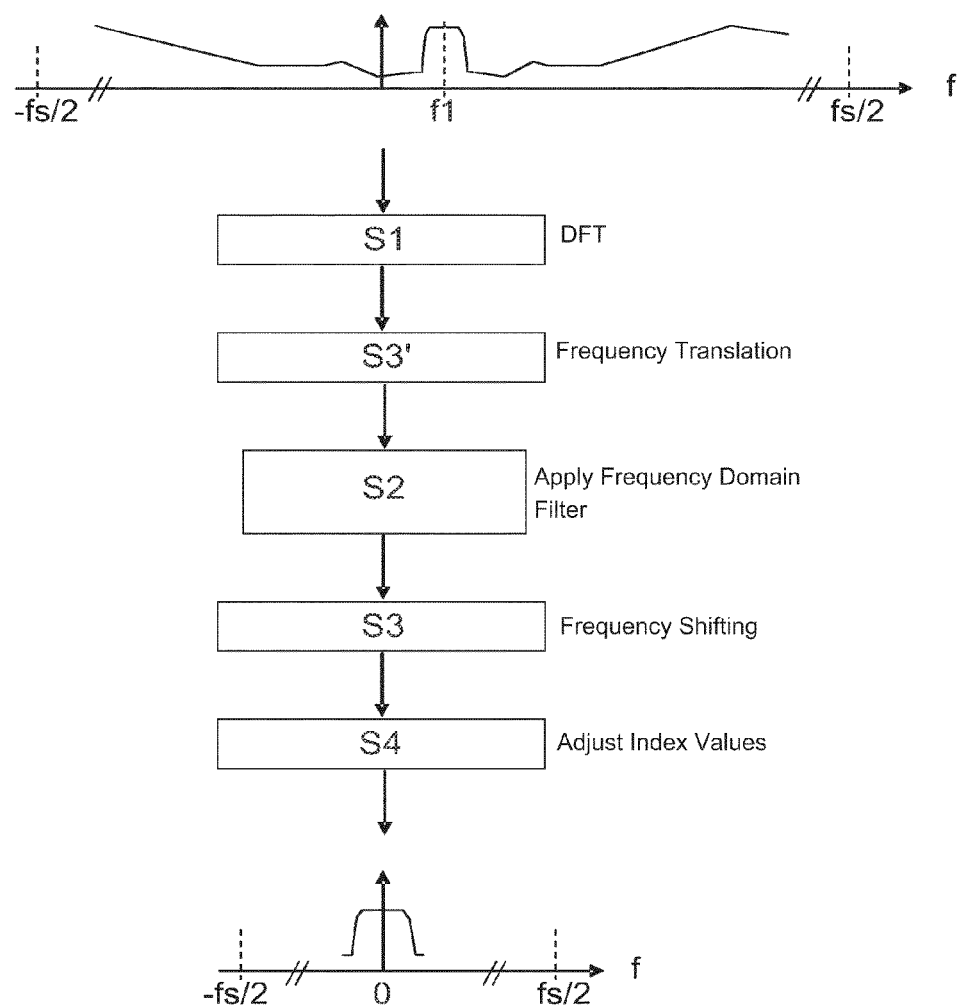
FIG. 2 is a flow chart showing an embodiment of the method according to the present invention.

Now the aspect of frequency translation is described in more detail. FIG. 2 is a flow chart showing an example implementation of the herein proposed method for frequency translation and sample rate adaptation according to an embodiment of the present invention. FIG. 3 is a schematic diagram showing the procedure of bin-frequency translation performed in steps 3, 3' of FIG. 2 in more detail.

Figure 3A:
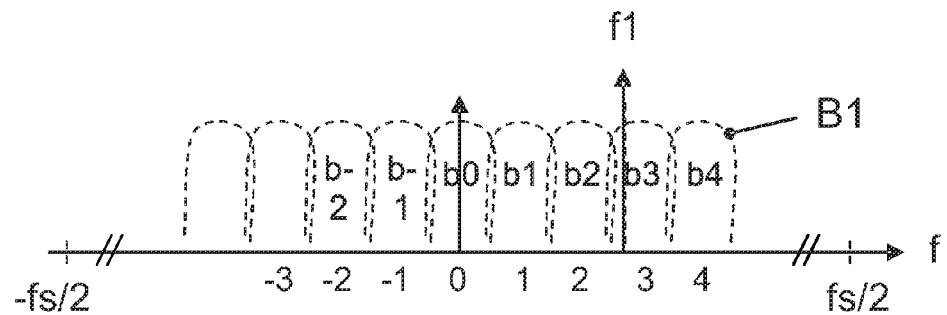
FIG. 3 is a schematic diagram explaining translation of frequency bins in the time domain in more detail.
Figure 3B:
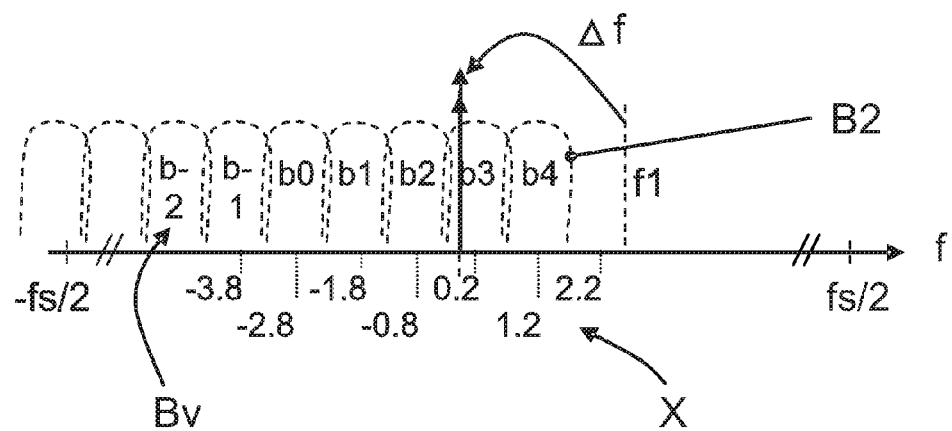

According to a first embodiment of the frequency translation, in step S1, the input signal (shown at the top of FIG. 2 and in FIG. 3(a)) with a low IF of f1 is transformed to the frequency domain using a DFT, producing complex bin coefficients . . . b-2, b-1, b0, b1 . . . etc. (FIG. 3).

In step S2, the bin coefficients are generally multiplied by the coefficients of the frequency-domain filter.

In step 3, the frequency shift is applied after the signal has passed through the frequency-domain filter of step S2.

The bin frequencies would ordinarily comprise the product of an integer index value and the bin frequency interval. However, as part of this embodiment, in step S4 the index values are all adjusted as real numbers, i.e. with both integer and fractional parts, such that the wanted signal, which is shown at the lower side of FIG. 2 and in FIG. 3(b), moves by Δf to a frequency at or close to zero Hz.

Effectively, the initial DFT bin coefficients B1 in FIG. 3, i.e. b-2, b-1, b0, b1 etc., are re-labelled so as to be associated with a new set of frequencies. Thereby the bin values Bv are assigned to the new bin indices X. This results in new bin coefficients B2 translated by Δf. This can be achieved with very little processing resource. The bin intervals remain unchanged.

In the first embodiment of the transformation, the frequency shift (step S3) is applied after the signal has passed through the frequency-domain filter (step S2). However, in general the frequency shift can be applied, optionally (i) immediately after the DFT in step S3'; (ii) just before the IDFT/SRC in step S3; or (iii) both before and after the filter step S2 in steps S3 and S3'.

Accordingly, in a second embodiment of the transformation, wherein option (i) is used, the index values of the DFT bins are modified and the indices for the IDFT are left as integer values. This allows the channel filter to be real, i.e. centred on zero.

In the first embodiment of the transformation, wherein option (ii) is used, the channel filter is complex, i.e. asymmetrical, and it is the indices of the IDFT bins that have to be modified.

In a third embodiment of the transformation, wherein option (iii) is implemented, there is the potential advantage to be gained in both the DFT and IDFT (steps S1 and S4), when an equal frequency offset is applied in both places. This allows a common set of sine and cosine values to be used in the DFT and IDFT, thereby saving computation time and storage.

Now the aspect of sample rate change is described in more detail. The fractional sampling-rate change (SRC) is implemented as part of the IDFT function in step S4. Without any sampling rate change, the IDFT output would be generated by multiplying the magnitude of the bin coefficients by a cosine function of the appropriate phase and then adding together the full set of cosine functions. The argument (i.e. phase) of each cosine is a sum of a fixed phase applying to each bin (depending on the behaviour of the input signal) and the product of a minimum phase step and the bin index number. The minimum phase step is given by $2\pi/N$ where N is equal to both the length of the DFT (i.e. number of samples) and the total number of frequency bins.

An approach for straight-forward (i.e. integer) down-sampling would be to calculate the IDFT output samples for only every nth sample of the original set, where n is an integer. This is equivalent to scaling the minimum phase step by a factor n. To be valid, it also assumes that the bin coefficients for frequencies higher than the new sampling frequency are zero or insignificant (i.e. Nyquist theorem must not be violated).

For a fractional (or real) rate change, the minimum phase step is scaled by a real (irrational) number to suit the required output sampling rate. This will give rise to a new set of output samples with a new (and constant) sampling interval.

If the output of the IDFT without a sample-rate change is given by:

$$f_{out}(t) = \sum_{n=0}^{N-1} |B_n| \cos(n\phi)$$

where N is the number of bins, $|B_n|$ is the magnitude of the nth bin and $\phi$ is the minimum phase step given by $$\phi = \frac{2\pi}{N},$$

then if a fractional sampling rate change is to be implement, $\phi$ has to be scaled by a factor $f_{s2}/f_{s1}$ and hence the new expression for $f_{out}$ becomes:

$$f_{out}(t) = \sum_{n=0}^{N-1} |B_n| \cos(n\phi') \text{ where } \phi' = \frac{f_{s2}}{f_{s1}}$$

wherein $f_{s2}$ and $f_{s1}$ are the new and old sampling frequencies.

With this method a very economic way of sample rate change (SRC) is achieved which is carried out concurrently with the IDFT in step S4 of FIG. 2, thereby saving significant amounts of computational load and power consumption in receiver systems. This is an important advantage for mobile radio receiver systems having limited power resources.

However, there will always be a "remainder" time interval between the last sample in the series and the time boundary T, where T is the period of the original signal entering the DFT. It is important to store the phases of the Fourier components of this last sample in the series to try to ensure good continuity with the next block of signal data processed by the arrangement.

Figure 4:
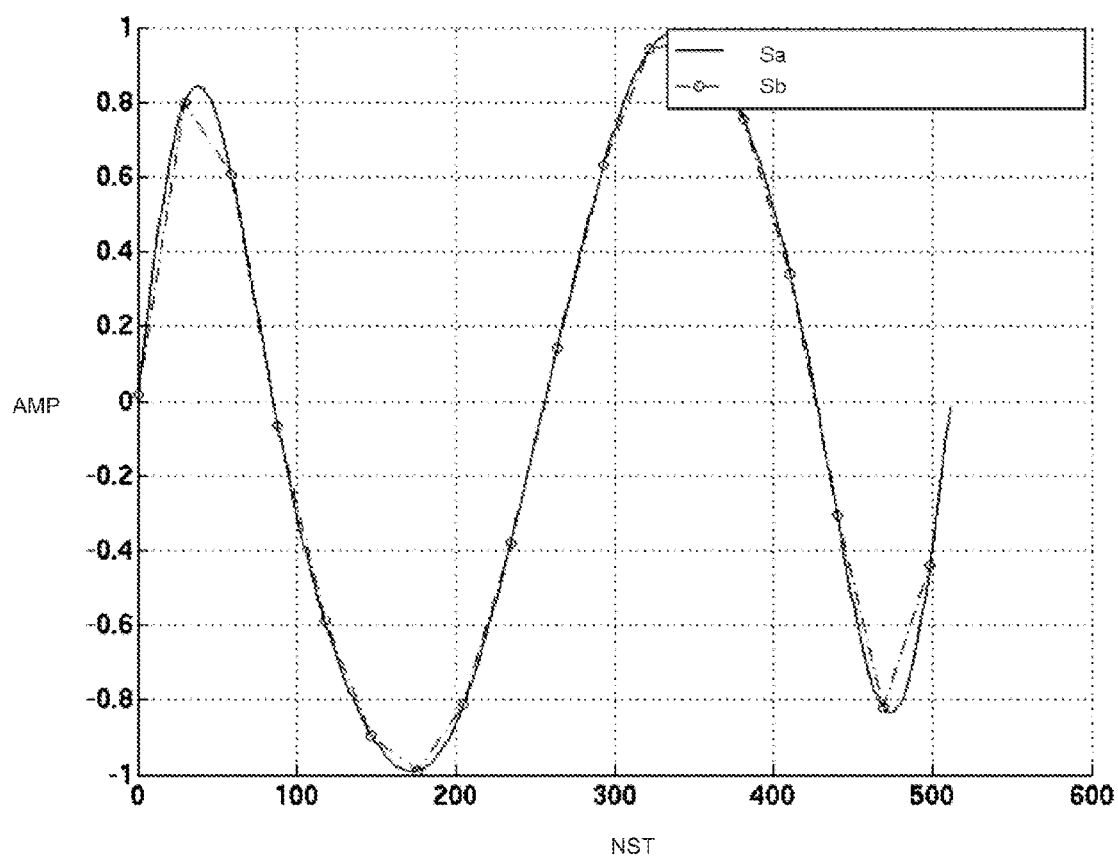
FIG. 4 a graph showing an example of an output signal the sample rate of which has been changed according to an embodiment of the present invention.

The illustration in FIG. 4 demonstrates the herein proposed technique by a graph produced using Matlab. In this case, the normal IDFT would use 512 points (NST), but the signal is effectively decimated by an irrational respectively real factor of 29.314159. It can be seen that there is a good alignment between the points of the normal (Sa) and fractionally-adjusted output (Sb).

It is to be noted that the present invention is not restricted to the above specific embodiments. That is, on the basis of the teaching contained in the description, various modifications and variations of the invention are possible.

In particular the DFT length is not restricted to a power of 2, but can be any number suitable for the intended application.

Furthermore, this invention is generally applicable to radio receiver systems where digital processing is employed. It is applicable in the general context of Software-defined Radio and is for example particularly relevant to multi-mode mobile wireless terminals.

Summarizing, an arrangement and a method for digitally filtering a time-discrete digital signal are provided, wherein the signal is transformed to the frequency domain using discrete Fourier transformation, the signal is filtered in the frequency domain, the filtered signal is transformed back to the time domain using inverse discrete Fourier transformation to create an output signal, and wherein bin frequencies of said signal in the frequency domain are translated by a real amount and the sampling rate of the output signal is changed by a real factor.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single means or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for digitally filtering a time-discrete signal, comprising:
    transforming said signal to the frequency domain using discrete Fourier transformation having a predetermined resolution;
    filtering said signal in the frequency domain; and
    transforming said filtered signal back to the time domain using inverse discrete Fourier transformation to create an output signal;
    wherein bin frequencies of said signal in the frequency domain are translated by a real amount, wherein said translating of bin frequencies is performed in two parts before and after said filtering of the signal in the frequency domain; and
    wherein a sampling rate of said output signal is changed by a real factor.

2. The method as claimed in claim 1, wherein said two parts of translating of bin frequencies apply the same real amount.

3. The method as claimed in claim 1, wherein said predetermined resolution of the discrete Fourier transformation is pre-calculated by a controller.

4. The method as claimed in claim 1, wherein the inverse discrete Fourier transformation is calculated by a controller in real time in response to changes in signal characteristics.

5. The method as claimed in claim 1, wherein filter characteristics of said filtering in the frequency domain are adapted in response to changes in signal characteristics.

6. The method as claimed in claim 1, wherein said translating of bin frequencies comprises re-labelling of said bin frequencies using a real amount.

7. The method as claimed in claim 1, wherein said changing of the sampling rate comprises scaling a minimum phase step of the inverse discrete Fourier transformation by a real factor.

8. The method as claimed in claim 7, wherein phases of the Fourier components of a respective last sample in a series are stored to ensure continuity with a next block of signal data.

9. A computer program product, comprising a non-transitory machine readable medium storing instructions that, when loaded into a computer device, enable said computer device to carry out a method as claimed in claim 1.

10. An arrangement for digitally filtering a time-discrete signal, comprising:
- a first transformer to transform said signal to the frequency domain using discrete Fourier transformation having a predetermined resolution;
- at least one translator to translate bin frequencies of said signal in the frequency domain by a real amount;
- a frequency domain filter to filter said signal in the frequency domain;
- a second transformer to transform said signal back to the time domain using inverse discrete Fourier transformation to create an output signal; and
- a controller to adapt at least one of filter characteristics of the frequency domain filter and the resolution of said first transformer in response to changes in the signal characteristics and a spectrum analyzer to analyse the characteristics of the signal in the frequency domain at least one of before and after filtering,
- wherein said second transformer comprises an adaptor configured to change a sampling rate of the output signal by a real factor.

11. The arrangement as claimed in claim 10, wherein said at least one translator translates said bin frequencies by re-labelling said bin frequencies using a real amount.

12. The arrangement as claimed in claim 10, wherein said second transformer changes the sampling rate of said output signal by scaling a minimum phase step of said inverse discrete Fourier transformation by a real factor.

13. The arrangement as claimed in claim 12, wherein the arrangement stores phases of the Fourier components of a respective last sample in a series to ensure continuity with a next block of signal data.

14. A radio receiver system, comprising an arrangement as claimed in claim 10.

* * * * *